United States Patent
Michels et al.

(10) Patent No.: US 7,060,751 B2
(45) Date of Patent: Jun. 13, 2006

(54) GRAFT POLYMERS BASED ON ETHYLENE/α-OLEFIN RUBBERS AND PROCESS FOR THEIR PRODUCTION

(75) Inventors: Gisbert Michels, Leverkusen (DE); Holger Warth, Dormagen (DE); Pierre Vanhoorne, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/736,357

(22) Filed: Dec. 15, 2003

(65) Prior Publication Data

US 2004/0127642 A1 Jul. 1, 2004

(30) Foreign Application Priority Data

Dec. 19, 2002 (DE) ................................. 102 59 500

(51) Int. Cl.
*C08F 255/06* (2006.01)
(52) U.S. Cl. ........................ 525/69; 525/230; 525/233; 525/234; 525/238; 525/242; 525/316; 525/329.1
(58) Field of Classification Search ................. 525/69, 525/230, 233, 234, 238, 329.1, 242, 316
See application file for complete search history.

(56) References Cited

U.S. PATENT DOCUMENTS

| 3,683,050 A | 8/1972 | Meredith et al. ....... 260/876 R |
| 3,876,727 A | 4/1975 | Meredith et al. ........... 260/878 |
| 4,251,645 A | 2/1981 | Humme et al. ................ 525/75 |
| 4,268,638 A | 5/1981 | Shimokawa et al. ........ 525/263 |
| 4,314,041 A | 2/1982 | Shimokawa et al. .......... 525/53 |
| 4,485,212 A | 11/1984 | Wefer ............................ 525/64 |
| 4,490,507 A | 12/1984 | Abe et al. .................... 525/263 |
| 4,656,225 A | 4/1987 | Boutni et al. .................. 525/67 |
| 4,925,896 A | 5/1990 | Matarrese et al. ............. 525/53 |
| 5,304,597 A | 4/1994 | Ghidoni et al. ................ 525/66 |
| 5,306,778 A * | 4/1994 | Ishida et al. ................. 525/310 |
| 5,352,738 A | 10/1994 | Hiromoto et al. ............. 525/70 |
| 5,811,491 A | 9/1998 | Jagawa et al. ................. 525/71 |

FOREIGN PATENT DOCUMENTS

| CA | 1 274 635 | 9/1990 |
| EP | 0 054 148 | 6/1982 |
| GB | 2 059 427 | 4/1981 |
| JP | 50-109247 | 8/1975 |
| JP | 58-98354 | 6/1983 |

* cited by examiner

*Primary Examiner*—James J. Seidleck
*Assistant Examiner*—Olga Asinovsky
(74) *Attorney, Agent, or Firm*—Jill Denesvich

(57) ABSTRACT

A thermoplastic molding composition comprising a graft polymer is disclosed. The graft polymer contains:
  a) a continuous phase containing the polymerized product of at least one vinylaromatic monomer and at least one ethylenically unsaturated nitrile monomer, and
  b) a disperse phase containing ethylene/α-olefin rubber that is grafted with the polymerization product of at least one vinylaromatic monomer and at least one ethylenically unsaturated nitrile monomer.

The weight average molecular weight of the continuous phase is 130,000 to 275,000 g/mole and the disperse phase is characterized in that its, weight average particle size is less than 0.90 μm. The molding composition is characterized in improved resistance to weathering.

10 Claims, No Drawings

GRAFT POLYMERS BASED ON ETHYLENE/α-OLEFIN RUBBERS AND PROCESS FOR THEIR PRODUCTION

FIELD OF THE INVENTION

The present invention relates to thermoplastic molding compositions and in particular to compositions that contain graft polymers.

SUMMARY OF THE INVENTION

A thermoplastic molding composition comprising a graft polymer is disclosed. The graft polymer contains
a) a continuous phase containing the polymerized product of at least one vinylaromatic monomer and at least one ethylenically unsaturated nitrile monomer, and
b) a disperse phase containing ethylene/α-olefin rubber that is grafted with the polymerization product of at least one vinylaromatic monomer and at least one ethylenically unsaturated nitrile monomer.

The weight average molecular weight of the continuous phase is 130,000 to 275,000 g/mole and the disperse phase is characterized in that its weight average particle size is less than 0.90 μm. The molding composition is characterized in improved resistance to weathering.

BACKGROUND OF THE INVENTION

Graft polymers that may be obtained by graft polymerization of vinylaromatic monomers and vinyl nitrites on ethylene/α-olefin rubbers or ethylene/α-olefin-diene rubbers are known in principle and as a rule are designated graft polymers of the AES type. Graft polymers of the AES type are described for example in GB 2 059 427, DE 30 36 921 A1, EP 0 286 071 A2, EP 0 096 527 A2, WO 86/06733, EP 0 054 148 and U.S. Pat. No. 3,876,727.

Compared to graft polymers of the ABS type, they are characterised by an improved weathering stability.

The graft polymers of the AES type known from the prior art all have deficiencies however in at least one category of surface properties and mechanical and polymer-physical properties.

The object therefore existed, as before, of providing graft polymers based on ethylene/α-olefin rubbers that have a balanced ratio of surface properties and mechanical and polymer-physical properties.

It is furthermore known that blends that contain graft polymers of the AES type are resistant to weathering, whereas their mechanical properties in the low temperature range are however unsatisfactory. At temperatures below 0° C. these blends become brittle and exhibit unsatisfactory toughness properties. Accordingly the use of these molding compositions is restricted at low temperatures. In particular the notched-bar impact strength of AES blends in the low temperature range is poor, especially compared to acrylonitrile/butadiene/styrene (ABS) blends.

EP-A 0 502 367 relates to the production of AES graft polymers and a copolymer, the copolymer containing 60 to 76 wt. % of a vinyl type aromatic monomer and 40 to 24 wt. % of an aliphatic copolymer. Vinylaromatic compounds and/or nuclear-substituted vinylaromatic compounds and vinyl cyanides and/or (meth)acrylic acid ($C_1$–$C_8$) alkyl esters are grafted on. These thermoplastic copolymers are said to exhibit, inter alia, a good impact strength in addition to the desired good properties relating to surface gloss, weathering resistance and sliding properties.

JP-A 50 109 247 describes polycarbonate blends with AES that contains 0.1 to 10 wt. % of paraffin oil. JP-A 58 098 354 describes polycarbonate blends with AES and 0.5 to 20 wt. % of plasticisers for vinyl polymers. It is not known whether the use of special additives that specifically concentrate in the plasticised phase lead to a significant improvement of the low temperature properties in polycarbonate/AES blends.

The object of the present invention is accordingly also to modify AES blends so that they have an improved property profile, in particular also an improved notched-bar impact strength, while maintaining their weathering resistance in the low temperature range.

It has now surprisingly been found that the aforementioned objects may be achieved by the AES graft polymers according to the invention and molding compositions containing these AES graft polymers according to the invention.

DETAILED DESCRIPTION OF THE INVENTION

The present invention accordingly provides graft polymers containing
a) a continuous phase of polymerized vinylaromatic monomers and ethylenically unsaturated nitrile monomers, and
b) a disperse phase of ethylene/α-olefin rubber that is grafted with vinylaromatic monomers and ethylenically unsaturated nitrile monomers, wherein the continuous phase a) has a weight average molecular weight $M_w$ of greater than 130,000, preferably greater than 145,000, particularly preferably greater than 160,000 up to 275,000 g/mole, especially up to 250,000 g/mole, and the disperse phase b) is a grafted rubber phase that has a weight average particle size Dw of less than 0.90 μm, preferably less than 0.80 μm, a degree of grafting (measured by gel value measurement in acetone as solvent) of at least 0.25 and at most 0.65, preferably at least 0.30 and at most 0.60, a ratio of the gel value measured in tetrahydrofurane (THF) to the gel value measured in acetone of less than 0.1, preferably less than 0.05, and a glass transition temperature ($T_g$ determined by measuring the complex shear modulus as a function of the temperature) of the ethylene/α-olefin rubber is less than −50° C.

Suitable vinylaromatic monomers that together with ethylenically unsaturated nitrile monomers undergo free-radical polymerization and thereby form the continuous phase (matrix phase) a) of the molding compositions include styrene, α-methylstyrene, p-methylstyrene, divinylbenzene and/or other alkylstyrenes, preferably with 2 to 6 C atoms in the alkyl radical. In addition nuclear-substituted chlorinated styrenes may be used in admixture with the latter.

Particularly preferred vinylaromatic monomers are styrene, α-methylstyrene and/or p-methylstyrene. Most particularly preferred are styrene, α-methylstyrene as well as their mixtures.

Suitable ethylenically unsaturated nitrile monomers are preferably acrylonitrile and methacrylonitrile as well as their mixtures, acrylonitrile being particularly preferred.

The ratio of vinylaromatic monomers to ethylenically unsaturated nitrile monomers in the thermoplastic molding compositions according to the invention is 60–90 wt. % to 40–10 wt. % referred to the matrix phase a).

In addition there may be used in an amount of up to 30 wt. %, preferably up to 20 wt. % of the total amount of monomers, acrylic monomers or maleic acid derivatives such as for example methyl(meth)acrylate, ethyl(meth)acrylate, tert.-butyl(meth)acrylate, n-butyl(meth)acrylate, esters of fumaric and itaconic acid, maleic anhydride, maleic acid esters, N-substituted maleimides such as advantageously N-cyclohexylmaleimide or N-phenylmaleimide, N-alkylphenylmaleimide, and furthermore acrylic acid, methacrylic acid, fumaric acid, itaconic acid or their amides.

Ethylene/α-olefin rubbers suitable as graft base for the disperse phase b) contain ethylene, an α-olefin and optionally a non-conjugated diene in polymerized form.

Suitable α-olefins are propene, 1-butene, 1-hexene, 1-octene and their mixtures. Preferred α-olefins are propene, 1-hexene and 1-octene.

As non-conjugated dienes that serve to improve the graftability of the rubber, there may be used for example norbornenes such as alkenylnorbornenes and alkylidenenorbornenes, cyclic dienes such as dicyclopentadiene, as well as aliphatic dienes such as hexadiene or octadiene. Preferred dienes are ethylidenenorbornene, dicyclopentadiene, 1,4-hexadiene and 1,6-octadiene.

The ratio of ethylene to α-olefin is 30:70 to 70:30 wt. %, with the proviso that the rubbers are completely amorphous or largely amorphous. It has been shown that partially crystalline rubbers produce significantly poorer results. The content of non-conjugated dienes is 0 to 15 wt. %, preferably 0 to 10 wt. %.

Suitable rubbers have a Mooney viscosity ML (1+4) at 125° C. (without pretreatment, DIN 53523; ASTM D1646) of 3 to 50, preferably 3 to 30.

Suitable ethylene/α-olefin rubbers may have a linear or branched structure. It is also possible to use a mixture of linear and branched ethylene/α-olefin rubbers.

The rubber content of the thermoplastic molding compositions according to the invention is 10–70 wt. %, preferably 15–50 wt. %, particularly preferably 17–35 wt. % and most particularly preferably 18–23 wt. %, referred to the molding compositions.

The graft polymers according to the invention have a gloss at a measurement angle of 20° of greater than 65, preferably 70, and a gloss at a measurement angle of 60° of greater than 85, preferably 90, a notched-bar impact strength (ak-Izod) of greater than 20, preferably greater than 25, particularly preferably greater than 30 kJ/m$^2$, and a melt index of less than 14 g/10', preferably less than 12 g/10', and more preferably less than 10 g/10' (220° C./10 kg). On account of the smaller-content of double bonds of the ethylene/α-olefin rubbers, the graft polymers according to the invention have an improved weathering stability compared to ABS graft polymers.

The rubber-modified thermoplastic graft polymers according to the invention are produced in a preferably continuous procedure by free-radical polymerization of vinylaromatic monomers and ethylenically unsaturated nitrile monomers in the presence of an ethylene/α-olefin rubber in the presence of solvents, according to bulk polymerization or solution polymerization processes known in principle.

Suitable solvents for the free-radical polymerization in solvents are aromatic hydrocarbons such as toluene, ethylbenzene and xylenes and their mixtures. Toluene and xylenes as well as their mixtures are preferred, toluene being particularly preferred.

The polymerization is advantageously initiated by free-radical starters. Suitable initiators for the free-radical polymerization are graft-active peroxides that decompose into free radicals, such as peroxycarbonates, peroxydicarbonates, diacylperoxides, perketals or dialkylperoxides and/or azo compounds or mixtures thereof. Examples include azodiisobutyric acid dinitrile, azoisobutyric acid alkyl esters, tert.-butyl perpivalate, tert.-butyl peroctoate, tert.-butyl perbenzoate, tert.-butyl perneodecanoate and tert.-butyl per-(2-ethylhexyl)carbonate. These initiators are used in amounts of 0.005 to 1 wt. % referred to the monomers.

The process according to the invention is preferably carried out continuously. In the continuous embodiment the rubber solution consisting of rubber, solvent, monomers and optionally additives, monomers and solvents may advantageously be polymerized in a continuously charged, thoroughly mixed and stirred tank reactor with a stationary monomer conversion in the first stage, after the phase inversion, of more than 30%, and the free-radical initiated polymerization may be continued in cascade in at least one further stage up to a monomer conversion of 70–99% under thorough mixing in one or more further continuously operating stirred vessels. Apart from the polymerization syrup from the upstream-connected reactor, monomers, solvents, free-radical starters and further additives such as for example stabilisers may be metered in each case into the reactor connected upstream. Two stirred tank reactors are preferably used for the continuous polymerization.

Residual monomers and solvents may be removed by conventional techniques (for example in heat exchanger evaporators, flash evaporators, extrusion evaporators, thin film or thin layer evaporators, screw devolatilizers, stirred multiphase evaporators with kneading and stripping devices), the use of blowing agents and entrainment agents, for example steam or nitrogen, also being possible in this regard, and may be recycled to the process, i.e. for the production of the rubber solution, and/or to the polymerization reactors. Heat exchanger evaporators are preferably used.

Additives, for example stabilisers, anti-ageing agent, fillers and lubricants may be added during the polymerization and before or during the polymer separation. It is essential and important that the use of conventional molecular weight regulators such as mercaptans and olefins, for example tert.-dodecylmercaptan, n-dodecylmercaptan, cyclohexene, terpinolene and α-methylstyrene dimer be avoided in order to achieve a sufficiently high molecular weight and a sufficiently low melt index. It is also necessary to choose the reaction conditions so as to avoid a crosslinking of the rubber phase in order to maintain the ratio according to the invention of the gel value measured in THF to the gel value measured in acetone of less than 0.1, preferably less than 0.05. For example, the conventional peroxidic or sulfur-containing crosslinking agents must not be added.

In order to achieve a better mixing and dispersion of the fed-in rubber solution, the syrup may be pumped in a continuous cycle through mixing and shearing devices into the first reactor. Such loop reactors are known from the prior art and may be useful in adjusting the particle size of the rubber. It is also possible to arrange shearing devices between two separate reactors in order to prevent backmixing, which leads to a broadening of the particle size distribution. A further possible way of achieving a better mixing and dispersion of the rubber phase is to use stirring devices that can exert particularly high shear rates.

The mean residence time is 1 to 10 hours, preferably 2 to 8 hours. The polymerization temperature is 50° C. to 180° C., preferably 100° C. to 160° C. The reaction temperature in the first reactor is preferably 100° C. to 130° C., particularly preferably 110° C. to 130° C. The reaction temperature in the second reactor is preferably 120° C. to 160° C., particularly preferably 130° C. to 160° C.

The graft polymers according to the invention may be processed into molded parts by extrusion, injection molding, calendering, hollow body blowing, pressing and sintering. The present invention accordingly also provides molding compositions containing at least one graft polymer according to the invention.

The graft polymers according to the invention may be employed in compositions with at least one polymer selected from the group consisting of polycarbonates, polyamides, polyalkylene terephthalates and copolymers containing vinylaromatic monomers and ethylenically unsaturated nitrile monomers.

The molding compositions according to the invention may contain in particular aromatic polycarbonates and/or aromatic polyester carbonates. These are known in the literature and may be produced by methods known in the literature. For the production of aromatic polyester carbonates, see for example Schnell, "Chemistry and Physics of Polycarbonates", Interscience Publishers, 1964 as well as DE-A 1 495 626, DE-A 2 232 877, DE-A 2 703 376, DE-A 2 714 544, DE-A 3 000 610, DE-A 3 832 396; for the production of aromatic polyester carbonates see for example DE-A 3 077 934 or WO 00/26275.

The production of aromatic polycarbonates may be carried out by reacting diphenols with carbonic acid halides, preferably phosgene, and/or with aromatic dicarboxylic acid dihalides, preferably benzenedicarboxylic acid dihalides, by the phase interface process, optionally with the use of chain terminators, for example monophenols, and optionally with the use of trifunctional or higher than trifunctional branching agents, for example triphenols or tetraphenols.

Dihydroxy compounds suitable for the production of the aromatic polycarbonates and/or aromatic polyester carbonates are preferably those of the formula (I)

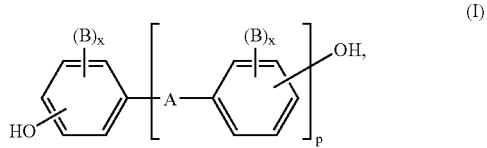

(I)

in which

A denotes a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, onto which further aromatic rings, optionally containing heteroatoms, may be condensed, or a radical of the formula (II) or (III)

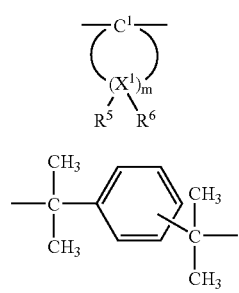

B in each case denotes $C_1$ to $C_{12}$-alkyl, preferably methyl, halogen, preferably chlorine and/or bromine x in each case independently of one another denotes 0, 1 or 2, p is 1 or 0, and $R^5$ and $R^6$ may be chosen individually for each $X^1$, and independently of one another denote hydrogen or $C_1$ to $C_6$-alkyl, preferably hydrogen, methyl or ethyl, $X^1$ denotes carbon, and m is a whole number from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and α,α-bis-(hydroxyphenyl)-diisopropylbenzenes as well as their nuclear-brominated and/or nuclear-chlorinated derivatives.

Particularly preferred diphenols include 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone as well as their dibrominated and tetrabrominated or chlorinated derivatives such as for example 2,2-bis(3-chloro-4-hydroxyphenyl)-propane, 2,2-bis(3,5-dichloro-4-hydroxyphenyl)-propane or 2,2-bis(3,5-dibromo-4-hydroxyphenyl)-propane. Particularly preferred is 2,2-bis(4-hydroxyphenyl)-propane (bisphenol A).

The diphenols may be used individually or as arbitrary mixtures with one another. The diphenols are known in the literature or may be obtained by processes known in the literature.

Suitable chain terminators for the production of the thermoplastic, aromatic polycarbonates or polyester carbonates include for example phenol, p-chlorophenol, p-tert.-butylphenol or 2,4,6-tribromophenol, as well as long-chain alkylphenols such as 4-(1,3-tetramethylbutyl)-phenol according to DE-A 2 842 005, or monoalkylphenol. The amount of chain terminators is in general between 0.5 mole % and 10 mole %, referred to the molar sum of the diphenols used in each case.

The thermoplastic, aromatic polycarbonates have mean, weight average molecular weights ($M_w$,) measured by ultracentrifugation or light-scattering measurements of 10,000 to 200,000, preferably 15,000 to 80,000. Mixtures of polycarbonates with various molecular weights may also be used.

The thermoplastic, aromatic polycarbonates or polyester carbonates may be branched in a known manner, and more specifically preferably by the incorporation of 0.05 to 2.0 mole %, referred to the sum of the diphenols used, of trifunctional or higher than trifunctional compounds, for example those with three and more phenolic groups. As branching agents there may for example be used trifunctional or higher functional carboxylic acid chlorides such as trimesic acid trichloride, cyanuric acid trichloride or trifunctional or higher functional phenols such as phloroglucin in amounts of 0.01 to 1.0 mole % referred to the diphenols used. Phenolic branching agents may be introduced together with the diphenols, while acid chloride branching agents may be added together with the acid dichlorides.

Both homopolycarbonates as well as copolycarbonates are suitable. Preferred polycarbonates include, in addition to the bisphenol A homopolycarbonates, also the copolycarbonates of bisphenol A with up to 15 mole %, referred to the molar sums of diphenols, of other than preferred or particularly preferred aforementioned diphenols, in particular 2,2-bis(3,5-dibromo-4-hydroxyphenyl)-propane.

Aromatic dicarboxylic acid dihalides for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in a ratio between 1:20 and 20:1.

In the production of polyester carbonates a carbonic acid halide, preferably phosgene, is additionally co-used as bifunctional acid derivative.

The aromatic polyester carbonates may also contain incorporated aromatic hydroxycarboxylic acids.

The proportion of carbonate structural units may vary arbitrarily in the thermoplastic, aromatic polyester carbonates. The proportion of carbonate groups is preferably up to 100 mole %, in particular up to 80 mole %, particularly preferably up to 50 mole %, referred to the sum total of ester groups and carbonate groups. Both the ester proportion as well as the carbonate proportion of the aromatic polyester carbonates may be present in the form of blocks or randomly distributed in the polycondensate.

The relative solution viscosity ($\eta_{rel.}$) of the aromatic polycarbonates and polyester carbonates is in the range 1.18 to 1.4, preferably 1.20 to 1.32 measured in solutions of 0.5 g of polycarbonate or polyester carbonate in 100 ml of methylene chloride solution at 25° C.

The thermoplastic, aromatic polycarbonates and polyester carbonates may be used individually or in arbitrary mixtures.

The molding compositions according to the invention may furthermore also contain polyalkylene terephthalates, such as are described for example in WO 00/29 476. Polyethylene terephthalates or polybutylene terephthalates or mixtures thereof are preferred.

The molding compositions according to the invention may furthermore also contain rubber-free copolymers. Copolymers of styrene and acrylonitrile in a weight ratio of 95:5 to 50:50 are preferably used as rubber-free copolymers, in which connection styrene and/or acrylonitrile may be wholly or partially replaced by α-methylstyrene, methyl methacrylate or N-phenylmaleimide. Particularly preferred are those copolymers whose acrylonitrile proportion is less than 30 wt. %.

The copolymers preferably have mean molecular weights $\overline{M}w$ of 20,000 to 200,000 and intrinsic viscosities [η] of 20 to 110 ml/g (measured in dimethylformamide at 25° C.).

Details of the production of these resins are described for example in DE-A 24 20 358 and DE-A 27 24 360. Vinyl resins produced by bulk polymerization or solution polymerization have proved particularly suitable. The copolymers may be added individually or in an arbitrary mixture.

In a preferred embodiment the molding compositions according to the invention contain 10 to 80 wt. %, preferably 20 to 70 wt. % and particularly preferably 25 to 60 wt. % of the graft polymer according to the invention, and 20 to 90 wt. %, preferably 30 to 80 wt. % and particularly preferably 40 to 75 wt. % of polycarbonate, referred in each case to the sum total of graft polymer and polycarbonate.

If rubber-free copolymers are used, their amount is up to 50 wt. %, preferably up to 30 wt. % and particularly preferably up to 20 wt. % referred to the sum total of graft polymer, polycarbonate and rubber-free copolymer.

The molding compositions according to the invention may furthermore contain known additives for blends as well as aromatic polycarbonates, such as at least one of the conventional additives such as lubricants and mold release agents, for example pentaerythritol tetrastearate, nucleating agents, flameproofing agents, antistatics, stabilisers, fillers and reinforcing agents, as well as dyes and pigments and also electrically conducting additives, for example polyaniline or nanotubes.

Phosphorus-containing flameproofing agents within the context of the present invention are particularly preferably selected from the groups comprising monomeric and oligomeric phosphoric acid and phosphonic acid esters, phosphonatamines and phosphazines, in which connection mixtures of several components selected from one or various of these groups may also be used as flameproofing agents. In addition, halogen-free phosphorus compounds other than those specifically mentioned here may be employed individually or in arbitrary combination with other halogen-free phosphorus compounds.

The filled and/or reinforced molding compositions may contain up to 60 wt. %, preferably 5 to 40 wt. %, referred to the filled and/or reinforced molding compositions, of fillers and/or reinforcing agents. Preferred reinforcing agents are glass fibres. Preferred fillers, which may also have a reinforcing effect, include glass spheres, mica, silicates, quartz, talcum, titanium dioxide and Wollastonite.

The molding compositions according to the invention may contain up to 35 wt. % referred to the composition of a further, optionally synergistically acting, flameproofing agent. As further flameproofing agents there may be mentioned by way of example organic halogenated compounds such as decabromobisphenyl ether, tetrabromobisphenol, inorganic halogenated compounds such as ammonium bromide, and nitrogen compounds such as melamine.

The compositions according to the invention may be produced by mixing the constituents in a known manner and melt-compounding or melt-extruding the latter at elevated temperatures, preferably at 200° C. to 350° C., in conventional equipment such as internal kneaders, extruders or double-shaft screw extruders. The individual components may be mixed in successively or simultaneously. The molded articles according to the invention may be produced by extrusion or injection molding.

Molded articles according to the invention may be used for example in external applications, for example window parts, air conditioning units, water tanks, automobile external parts, garden equipment, housing parts for domestic appliances such as juice presses, coffee-making machines, mixers, for office machinery such as monitors, printers, copiers, or cover plates for the building and construction sector, and vehicle parts. They may also be used in the electrical engineering and electronics sector since they have extremely good electrical properties. The molding compositions according to the invention are furthermore suitable for the production of molded articles by thermoforming from previously fabricated sheets or films.

Further applications are possible:

as data processing equipment; telecommunications equipment such as telephones and telefax machines, computers, printers, scanners, plotters, monitors, keyboards, typewriters, dictating machines, etc., as electrical equipment: power supply units, charging equipment, small transformers for computers and consumer electronics, low voltage transformers, etc., as garden equipment: garden furniture, lawnmower housings, hosepipes and housings for garden watering equipment, garden houses, foliage suction equipment, shredders, cutters/choppers, spraying equipment, etc., in the furniture sector: benches, worktops, furniture laminates, roll-up desk fronts, office furniture, tables, chairs, seats, cabinets, shelving, door units, window units, bed storage drawers, etc., as sports/recreational equipment: toy cars, seating surfaces, pedals, sports equipment, bicycles, table tennis boards, home trainers, gold caddies, snowboards, outer parts of shoes/boots, camping gear, wicker-type beach chairs, etc., for internal/external use in the building and construction sector: house cladding, profiled strip material, pipework, cables, roll-up units, letterboxes, lamp housings, roof tiles, paving/floor tiles, partitions, cable ducting, skirting boards, sockets, etc., in the automobile/tracked vehicle sector: sidewall and roof linings, seat frames, seats, benches, tables, luggage racks, wheelcaps, rear spoilers, mudguards, rear flaps, bonnets, side parts, etc.

EXAMPLES

Measurement Methods

The conversion calculation was carried out by determining the solids by evaporation at 200° C. The rubber content in the end product was determined from the mass balance. Gel contents were determined in acetone as dispersion medium. The molecular weights of the soluble fraction were determined by gel permeation chromatography using THF or methylene chloride as solvent against polystyrene as standard. The particle size and distribution of the rubber particles were measured by zonal centrifugation; the weight average (Dw), the surface area average (Da) and the number average (Dn) are specified. The notched-bar impact strength ($a_k$ Izod) was measured at 23° C. according to ISO 180/1A, and the melt volume index (MFI 220° C./10 kg) was measured according to DIN 53735. The phase structure was investigated by measuring the complex shear modulus as a function of the temperature (dynamic/mechanical measurement of the shear modulus characteristic G*(T)) on the test specimens at a frequency of ca. 1 Hz in the temperature range from −150° C. to 200° C. using the RDA II instrument from Rheometrics. The glass transition temperature ($T_g$) of the plastic phase and of the matrix was determined. In addition the corrected shear modulus was determined at 23° C. ($G'_{corr}(RT)$). The measurement values were determined on injection-molded test specimens at a bulk temperature of 240° C. and a tool temperature of 70° C. The gloss was measured according to DIN 67530 at 20° C. and 60° C. on test specimens of size 60×75×1 mm using a BYK Gardener measuring instrument.

Examples 1–5

Production of the Graft Polymers According to the Invention

The graft polymers were produced by continuous solution polymerization in two series-connected reactors with helical stirrers. The polymer solution was evaporated continuously in a single-screw extruder under a vacuum of ca. 100 mbar. The rubber solution, monomers and an initiator solution were metered into the first reactor, and initiator solution was metered into the second reactor. A stabilizer solution was metered if necessary into the transfer line from the second reactor to the evaporation apparatus.

In Examples 1 and 2 an amorphous EPDM (Buna EP G 3850 from Bayer AG) with a Mooney viscosity ML (1+4) 125° C. of 28, an 5-ethylidene-2-norbornene (ENB) content of 8% and an ethylene content of 48% was used as rubber.

In Examples 3 and 4 a largely amorphous ethylene/1-octene (Engage 8842 from DuPont Dow Elastomers) with a Mooney viscosity ML (1+4) 121° C. of 26 and an ethylene content of 45% was used as rubber.

In Example 5 the stabiliser was metered into the second reactor. The evaporation was carried out continuously via a heat exchanger set consisting of two downstream-connected heat exchangers. The vacuum in the first evaporation stage was 200 mbar and in the second evaporation stage was 5 mbar.

Comparison Examples 1–3

In comparison example 1 a partially crystalline EPDM (identification EPDM 2) with a Mooney viscosity ML (1+4) 125° C. of 20, an ENB content of 4.2% and an ethylene content of 70% was used as rubber.

In comparison examples 2 and 3 Buna EP G 3850 was used as rubber.

The compositions of the formulations, results of the polymerization and characterisation of the molding compositions are given in the following Tables 1 to 3; all quantitative data are given in [parts] and throughputs in [parts/hour].

VWZ is the residence time of the reaction mixture in a given reactor.

TABLE 1

Quantitative data and metering flows

| | Example 1 | Example 2 | Example 3 | Example 4 | Example 5 | Comparison Example 1 | Comparison Example 2 | Comparison Example 3 |
|---|---|---|---|---|---|---|---|---|
| Rubber solution | | | | | | | | |
| Rubber | Buna EPG 3850 | Buna EPG 3850 | Engage 8842 | Engage 8842 | Buna EPG 3850 | EPDM 2 | Buna EPG 3850 | Buna EPG 3850 |
| Amount | 9.76 | 9.75 | 10.68 | 10.41 | 11.61 | 10.41 | 9.06 | 9.31 |
| Styrene | 29.73 | 32.99 | 31.56 | 31.66 | 33.29 | 31.57 | 30.28 | 30.69 |
| Toluene | 25.09 | 29.71 | 25.08 | 30.04 | | 28.96 | 23.41 | 27.71 |
| Xylene | | | | | 34.36 | | | |
| Stabilizer | Irganox 245 | | Irganox 245 | Irganox 1076 | | Irganox 1076 | Irganox 245 | Irganox 245 |
| Amount | 0.051 | | 0.049 | 0.101 | | 0.101 | 0.050 | 0.049 |
| Metering rate | 64.62 | 72.44 | 67.38 | 72.21 | 79.26 | 71.05 | 62.82 | 67.76 |
| Monomers | | | | | | | | |
| Styrene | 4.42 | 1.14 | 1.09 | 1.46 | 3.24 | 1.45 | 1.11 | 1.09 |
| Acrylonitrile | 11.38 | 11.37 | 10.88 | 10.46 | 11.72 | 10.43 | 11.14 | 10.88 |
| Metering rate | 15.80 | 12.51 | 11.97 | 11.92 | 14.96 | 11.88 | 12.26 | 11.97 |

TABLE 1-continued

Quantitative data and metering flows

|  | Example 1 | Example 2 | Example 3 | Example 4 | Example 5 | Comparison Example 1 | Comparison Example 2 | Comparison Example 3 |
|---|---|---|---|---|---|---|---|---|
| Initiat. soln. reactor 1 | | | | | | | | |
| Toluene | 8.36 | 3.71 | 3.72 | 3.62 | | 3.62 | 4.34 | 3.46 |
| Xylene | | | | | 1.85 | | | |
| Tert.-butylper-(2-ethylhexyl) carbonate | 0.023 | 0.046 | 0.045 | 0.044 | 0.047 | 0.022 | | |
| Tert.-butyl peroctoate | | | | | | | 0.052 | |
| Tert.-butyl perpivalate (74%) | | | | | | | | 0.147 |
| Metering rate | 8.38 | 3.76 | 3.76 | 3.67 | 1.90 | 3.64 | 4.36 | 3.61 |
| Initiat. soln. reactor 2 | | | | | | | | |
| Toluene | 3.72 | 3.71 | 8.36 | 2.53 | | 3.62 | 6.94 | 3.46 |
| Xylene | | | | | 3.69 | | | |
| Styrene | 0.34 | 0.34 | 1.14 | 0.23 | | 0.33 | 0.32 | |
| Acrylonitrile | 0.12 | 0.11 | 0.38 | 0.07 | | 0.11 | 0.11 | |
| Tert.-butylper-(2-ethylhexyl) carbonate | 0.046 | 0.046 | 0.045 | 0.066 | 0.059 | 0.066 | 0.086 | 0.107 |
| Irganox 1076 | | | | | 0.136 | | | |
| Metering rate | 4.22 | 4.22 | 9.93 | 2.91 | 3.88 | 4.13 | 7.45 | 3.57 |
| Stabilizer solution/dilution | | | | | | | | |
| Toluene | 6.97 | 6.96 | 6.97 | 9.05 | | 9.05 | 13.01 | 12.99 |
| Stabilizer | | Irganox 245 | | Irganox 1076 | | Irganox 1076 | Irgafos 168 | Irgafos 168 |
| Amount | | 0.103 | | 0.252 | | 0.252 | 0.100 | 0.098 |
| Metering rate | 6.97 | 7.06 | 6.97 | 9.30 | | 9.30 | 13.11 | 13.09 |

TABLE 2

Reaction conditions

|  | Example 1 | Example 2 | Example 3 | Example 4 | Example 5 | Comparison Example 1 | Comparison Example 2 | Comparison Example 3 |
|---|---|---|---|---|---|---|---|---|
| Reactor 1 | | | | | | | | |
| Temperature | 121 | 121 | 130 | 120 | 121 | 120 | 100 | 90 |
| Stirrer speed | 70 | 70 | 70 | 120 | 43 | 120 | 70 | 70 |
| VWZ [h] | 1.50 | 1.50 | 1.50 | 1.50 | 2.16 | 2.00 | 1.40 | 1.25 |
| Solids [wt. %] | 34.5 | 36.6 | 46.0 | 33.5 | 37.5 | 32.6 | 27.3 | 33.5 |
| Conversion [%] | 45.7 | 49.8 | 63.1 | 43.3 | 50.6 | 40.7 | 29.4 | 43.2 |
| Mw | | 212900 | 233800 | 207800 | | 221300 | | 167600 |
| Mn | | 68800 | 92100 | 82500 | | 87100 | | 75100 |
| Reactor 2 | | | | | | | | |
| Temperature | 140 | 140 | 140 | 140 | 135 | 140 | 145 | 145 |
| Stirrer speed | 20 | 20 | 20 | 20 | 15 | 20 | 20 | 20 |
| VWZ [h] | 2.00 | 2.50 | 2.00 | 2.50 | 3.40 | 3.50 | 2.80 | 2.75 |
| Solids [wt. %] | 51.8 | 54.8 | 54.8 | 54.1 | 53.5 | 54.2 | 54.35 | 56.0 |
| Conversion [%] | 83.3 | 89.4 | 89.1 | 87.6 | 86.4 | 87.8 | 88.4 | 91.6 |
| $M_w$ | 187040 | 173290 | 195300 | 158700 | 134370 | 162100 | 149250 | 122000 |
| Mn | 55268 | 50727 | 61100 | 54800 | 41840 | 47100 | 42370 | 38500 |
| Rubber content [%] | 20.2 | 19.1 | 21.0 | 21.2 | 21.7 | 21.2 | 19.2 | 19.1 |
| $Gel_{acetone}$ [%] | 27.2 | 29.0 | 30.5 | 30.9 | 29.2 | 30.7 | 29.9 | 31.5 |
| Degree of grafting | 0.34 | 0.52 | 0.46 | 0.46 | 0.35 | 0.45 | 0.56 | 0.65 |
| Evaporation | | | | | | | | |
| Temperature [° C.] | 225 | 241 | 226 | 249 | 240/250 | 248 | 225 | 225 |

TABLE 3

Properties

|  | Example 1 | Example 2 | Example 3 | Example 4 | Example 5 | Comparison Example 1 | Comparison Example 2 | Comparison Example 3 |
|---|---|---|---|---|---|---|---|---|
| Gloss | | | | | | | | |
| 20° | | | 69 | | | 78 | | |
| 60° | | | 91 | | | 96 | | |

TABLE 3-continued

|  | Example 1 | Example 2 | Example 3 | Example 4 | Example 5 | Comparison Example 1 | Comparison Example 2 | Comparison Example 3 |
|---|---|---|---|---|---|---|---|---|
| Properties |
| $a_k$ [kJ/m$^2$] | 36.4 | 30.1 | 44.2 | 27.0 | 29.2 | 12.1 | 26.4 | 14.2 |
| Gel$_{THF}$ [%] | 0.2 | 2.2 | 0.6 | 1.4 | 0.2 | 2.6 | 6.3 | 7 |
| Gel$_{THF}$ [%]/Gel$_{acetone[\%]}$ | 0.007 | 0.076 | 0.020 | 0.045 | 0.007 | 0.085 | 0.211 | 0.222 |
| MFR [g/10'] (220° C./10 kg] | 7.1 | 4.6 | 6.7 | 9.3 | 9.8 | 7.6 | 11.5 | 15.1 |
| Dw | 0.78 | 0.74 | 0.70 | 0.63 | 0.592 | 0.73 | 1.17 | 1.38 |
| Da | 0.46 | 0.34 | 0.41 | 0.33 | 0.405 | 0.31 | 0.45 | 0.51 |
| Dn | 0.26 | 0.16 | 0.19 | 0.16 | 0.243 | 0.13 | 0.19 | 0.23 |
| Glass transition temperature [° C.], rubber phase |  |  |  |  | −54 |  |  |  |
| Glass transition temperature [° C.], matrix |  |  |  |  | 104 |  |  |  |

Examples of the Production of Blends

PC/AES blends of the following composition were produced as base material for carrying out the tests:

The components were mixed in a 3 l capacity internal kneader. The molded articles are produced in an Arburg 270 E type injection molding machine at 260° C.

The blends 6 to 10 according to the invention and the comparison examples 6 to 8 were produced according to the following formulation:
58 parts by weight of polycarbonate (Makrolon® 2600)
0 and 3 (Example 6) parts by weight of styrene/acrylonitrile (SAN M 60)
42 and 41 (Example 6) parts by weight of AES blend according to the invention
0.9 part by weight of conventional additives, such as for example mold release agents, antioxidants.

The comparison examples 4 (9% rubber content) and 5 (8% rubber content) were produced according to the following formulation:
58 parts by weight of polycarbonate (Makrolon® 2600)
30.5 and 29.1 parts by weight of styrene/acrylonitrile (SAN M 60)
11.5 and 12.9 parts by weight of AES blend (Blendex® WX 270)
0.9 part by weight of conventional additives, such as for example mold release agents, antioxidants.

The notched bar-impact strength was measured at 23° C. on molded articles produced from the resultant materials, and the toughness/embrittlement transition (sharp drop), the melt-volume rate and the modulus of elasticity were all measured at low temperatures.

The determination of the notched-bar impact strength $a_k$ was carried out according to ISO 180/1A. The critical temperature, i.e. the temperature below which a brittle fracture behaviour instead of a tough fracture behaviour occurs, was determined correspondingly. The determination of the modulus of elasticity was carried out according to ISO 527 at 1 mm/min. The melt volume flow rate (MVR) was determined according to ISO 1133 at 260° C. and 5 kg loading weight.

The test results for the blends are given in Table 4. These results show a marked drop in the critical temperature (tough/brittle transition) without however mechanical properties such as the notched-bar impact strength being adversely affected. This is a clear measure of the improved efficiency of the molding compositions according to the invention compared to the prior art, as is evident from the two comparison examples based on commercially obtainable AES graft polymers.

TABLE 4

PC/AES blends

|  | Comparison 4 | Comparison 5 | Example 6 | Example 7 | Example 8 | Example 9 | Example 10 |
|---|---|---|---|---|---|---|---|
| Rubber content AES | 9 parts by wt. commercial | 8 parts by wt. commercial | 8.2 parts by wt. from Ex. 1 | 9 parts by wt. from Ex. 2 | 8 parts by wt. from Ex. 3 | 9 parts by wt. from Ex. 4 | 9 parts by wt. from Ex. 5 |
| $A_k$ IZOD 23° C. [kJ/m$^2$] | 70 | 70 | 48 | 52 | 54 | 45 | 48 |
| $A_k$ IZOD −10° C. [kJ/m$^2$] | 21 | 13 | 37 | 44 | 45 | 39 | 45 |
| Tough/brittle transition [° C.] | −5 | +5 | −20 | −25 | −25 | −15 | −15 |
| Mod. Elast. [MPa] | 2340 | 2428 | 2290 | 2390 | 2300 | 2320 | 2320 |

|  | Comparison 6 | Comparison 7 | Comparison 8 |
|---|---|---|---|
| Rubber content | 8.9 parts by wt. from comp. ex. 1 | 8.1 parts by wt. from comp. ex. 1 | 6.8 parts by wt. from comp. ex. 1 |
| $A_k$ IZOD 23° C. [kJ/m$^2$] | 40 | 48 | 89 |
| $A_k$ IZOD −10° C. [kJ/m$^2$] | 23 | 17 | 17 |
| Tough/brittle transition [° C.] | −5 | 15 | 5 |
| Mod. Elast. [MPa] | 2384 | 2384 |  |

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising a graft polymer that contains:
   a) a continuous phase containing the polymerized product of at least one vinylaromatic monomer and at least one ethylenically unsaturated nitrile monomer, and
   b) a disperse phase containing ethylene/α-olefin rubber that is grafted with the polymerization product of at least one vinylaromatic monomer and at least one ethylenically unsaturated nitrile monomer wherein the weight average molecular weight of the continuous phase is 130,000 to 275,000 g/mole and where the disperse phase is characterized in that its weight average particle size is less than 0.90 μm, its degree of grafting (measured by gel value measurement in acetone as solvent) is 0.25 to 0.65, the ratio of the gel value measured in THF to the gel value measured in acetone is less than 0.1 and the glass transition temperature of the ethylene/α-olefin rubber (determined by measuring the complex shear modulus as a function of the temperature) is less than −50° C.

2. The composition of claim 1 wherein the vinylaromatic monomer is selected from the group consisting of styrene, α-methylstyrene, p-methylstyrene, divinylbenzene, $C_{2-6}$-alkylstyrenes and nuclear-substituted chlorinated styrenes.

3. The composition of claim 1 wherein the ethylenically unsaturated nitrile monomer is selected from the group consisting of acrylonitrile and methacrylonitrile.

4. The composition of claim 1 wherein the α-olefin is at least one member selected from the group consisting of propene, 1-butene, 1-hexene and 1-octene.

5. The composition of claim 1 wherein the ethylene/α-olefin rubber further contain the structural units derived from at least one non-conjugated diene.

6. A process for the production of the molding composition according to claim 1 comprising in a first stage polymerizing by free radical initiation a reaction mixture that contains at least one vinylaromatic monomer, at least one ethylenically unsaturated nitrile monomer, at least one aromatic hydrocarbon solvent and ethylene/α-olefin rubber, in a continuously charged, thoroughly mixed and stirred tank reactor at a stationary monomer conversion of more than 30 wt % under condition sufficient to bring about phase inversion to produce a partially converted mixture and further polymerizing the partially converted mixture in at least one further stage in one or more continuously operating stirred vessels up to a monomer conversion of 70–99% characterised in that no molecular weight regulators are added.

7. The process according to claim 6, wherein the residence time of the reaction mixture in the reactors is 1 to 10 hours and the reaction temperature in the stirred tank reactor is 100° C. to 130° C.

8. The molding composition of claim 1 further comprising at least one member selected from the group consisting of polycarbonate, polyamide, polyalkylene terephthalate, and a copolymer of vinylaromatic monomers and ethylenically unsaturated nitrile monomers.

9. The molding composition of claim 8 wherein the graft polymer is present in an amount of 10 to 80 wt % and wherein said member is polycarbonate that is present in an amount of 20 to 90 wt %, the percents both occurrences referring to the sum total of graft polymer and polycarbonate.

10. A molded article comprising the composition of claim 1.

* * * * *